United States Patent Office 3,406,399
Patented Oct. 15, 1968

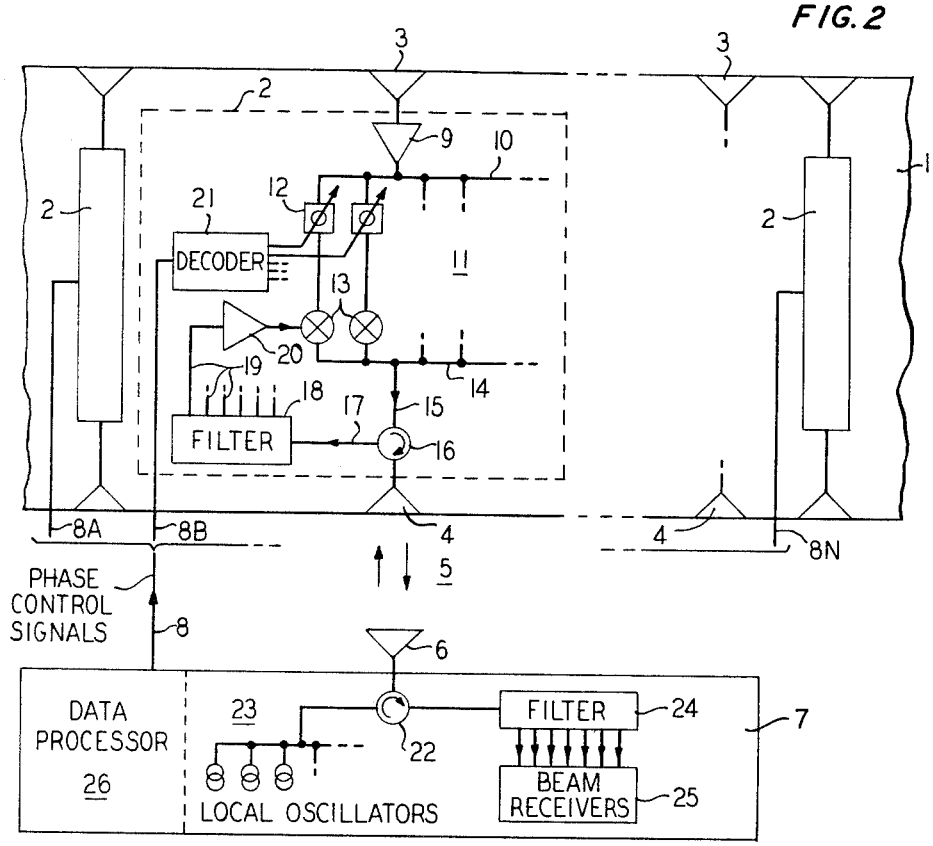

3,406,399
MULTIBEAM FORMATION MEANS
FOR ARRAY RADAR
Dietrich A. Alsberg, Berkeley Heights, N.J., assignor to
Bell Telephone Laboratories, Incorporated, Murray
Hill, N.J., a corporation of New York
Filed Dec. 2, 1966, Ser. No. 598,781
14 Claims. (Cl. 343—16)

ABSTRACT OF THE DISCLOSURE

A beam forming means for a multibeam phased array radar receiver in which all high frequency couplings between the antenna and the rest of the radar system are accomplished by space feed techniques using frequency multiplexing principles.

Background of the invention

The invention relates to phased array radar receivers of the type capable of simultaneously receiving a plurality of radar signals from reflecting objects in space and forming a separate beam for each object. More particularly, the invention relates to an improved means for forming the beams.

Phased array antenna systems have been known for some time and the basic principles, particularly for linear arrays, are quite old as disclosed in United States Patent No. 2,286,839 granted June 16, 1942 to S. A. Schelkunoff. This patent describes a directive linear array antenna system and cites other art related to the same subject. Two-dimensional planar arrays for radar applications have been developed from these principles and, because of the number of antenna elements involved, the circuitry leading to them has become quite complicated and costly. This complication and cost have become immensely aggravated by planar arrays required to simultaneously form a plurality of beams. Multi-beam phased array radars generally accomplish the beam forming function remote from the antenna proper in what is currently a rather massive structure located in the main building housing the radar. The elements of the antenna are connected to the beam forming networks by lengthy coaxial cables which must be constructed closely as to length and phase stability. Also, in the beam forming network, additional waveguides and coaxial lines are used in achieving the summation of the signals from the antenna elements. These elaborate cables and formation networks contribute significantly to the high cost of multifunction array radars. Applicant is aware that single function array radar systems exist which use a space feed to good advantage and accomplish the phase control required for each antenna element through a phase shifter incorporated immediately behind the antenna element. However, applicant is not aware that the advantages of space feed have either been appreciated or successfully realized in a practical structure by anyone in multifunction array radar systems.

Summary of the invention

The structural complications and the cost of construction have been materially reduced by the present invention which comprises an improved beam forming means for a multibeam phased array radar receiver in which all high frequency couplings between the antenna and the rest of the radar system are accomplished by a space feed using frequency multiplexing principles. The several beams are separated into different frequency bands by beating the radar signals with outputs from a plurality of local oscillators. Each array antenna element is space coupled through a second antenna element to a common space fed antenna. The local oscillators feed from the common antenna to all of the second antenna elements where a frequency separation means separates them and feeds them to a plurality of modulators connected between the array antenna element and its second antenna element. The modulation products are space fed back to the common antenna where additional frequency separation means separate and feed them to the beam receivers.

Brief description of the drawing

The invention may be better understood by reference to the accompanying drawings, in which:

FIG. 1 is a block diagram of a phased array radar system schematically illustrating the space feed concept of this invention; and FIG. 2 discloses in greater detail the essential elements of the improved beam forming means of this invention.

Description of the preferred embodiment

In FIG. 1, a planar array of antenna elements 1 is disclosed as having a plurality of antenna cells 2, one of which is shown in a cutaway portion of the supporting structure. Each of the cells 2 supports a receiver antenna element 3 at the outer face of the array. The outer face is presented to the incoming signal energy from reflecting objects in space. At the inner end of each antenna cell 2 there is supported a second antenna element 4 which is space coupled through the intervening space 5 to a single space feed antenna 6. It is to be understood that the single space feed antenna 6 is electrically coupled to all of the second antenna elements 4 supported at the rear face of the antenna array 1. It is to be further understood that the signals received by the receiver antenna elements 3 may come from a plurality of arbitrary directions in space, all of which have been illuminated from a transmitting antenna, not shown, at a single radar frequency. As is well known in phase array radar technique, the signals reflected from any given target in space will, in general, arrive at the array receiver antenna elements 3 at different times. These different times may be represented by different electrical phase angles and, by properly adjusting the phase delay between the receiver antenna element 3 and its second antenna element 4 in each of the cells, a beam may be formed from the energy components supplied by each cell and caused to be focused on the space feed antenna 6. This phase adjustment causes a coherency of these signals so that their combined effect at the space feed antenna 6 indicates the existence of a reflecting object at that particular angle with reference to the front face of the array.

Phase control is accomplished by control signals obtained from the radar receiver 7 by way of a transmission path 8. While space feeding could also be used for this purpose, it is unnecessary and a hard wire system with suitable multiplexing by conventional means is quite adequate. These signals come from the data processors in the receiver 7 and are applied as required to each of the cells 2 in the array. The means by which beam steering is accomplished in phased array systems is now well known in the art and requires no further discussion.

In accordance with the principles of this invention, a plurality of local oscillators are included in the radar receiver 7 and are coupled by any convenient means to the space feed antenna 6. The output frequency of these oscillators are all different and are space fed from antenna 6 to each of the second antenna elements 4 at the rear of the array. It is to be understood that as many local oscillators are provided and different frequencies are transmitted as there are beams to be formed. This will become more clear during a subsequent discussion of the structure in FIG. 2. Each of the second antenna elements 4 receives the outputs from all of the local oscillators and means contained in each cell 2 separate their frequencies into separate channels and applies them to a plurality of modulators inside the cell, one modulator for each beam to be formed, where the oscillator frequency is beat with the incoming signals to form sidebands. The upper sideband from each modulator is selected and transmitted back to the space feed antenna 6 by the second antenna element 4 through the intervening space 5. The directions of the beating frequencies and the upper sidebands are indicated by the arrows in space region 5 in FIG. 1. The upper sidebands are received by the space feed antenna 6 and are again separated according to frequency, one frequency being assigned for each beam to be formed. It will thus be apparent that for the reflected signal energy received by all the receiver elements 3 from any given target direction, the upper sidebands are transmitted back to space feed antenna 6 from each of the second antenna elements 4 in the array. By properly adjusting the phase of this signal in each cell 2, it will arrive at antenna 6 coherent with the corresponding signal from all other cells in the array. This energy is then transmitted by circuitry in radar 7 to the beam receivers, the circuitry of which is now conventional and well known in this art.

From the above description with reference to the block diagram in FIG. 1, it will be apparent that all of the conventional corporate feed structure presently existing between the antenna array 1 and the radar receiver 7 has been eliminated and has been replaced by a far more economical space feeding system using frequency multiplexing principles for beam separation and formation.

FIG. 2 shows a section through the array antenna 1 with the essential circuitry embodying the features of this invention shown schematically for one of the cells 2 within the dotted rectangle. The entire array of receiver antenna elements 3 simultaneously receive reflected radar signals from all reflecting objects in space. The signals received by the receiver antenna element 3 of each cell are amplified by a low noise preamplifier 9 and applied to a plurality of parallel-connected modulator channels 11 connected to the output circuit of amplifier 9 through a power divider 10 shown schematically in this figure. Each of the modulator channels contains a variable phase shifter 12 and a modulator 13 connected in series. The output circuits of all of the modulators 13 are collected in a summing circuit 14, also schematically shown, and applied to an input port of a microwave circulator 16 by way of circuit path 15. The number of parallel-connected channels 11 will equal the number of beams to be simultaneously formed by the radar. The received energy entering the input port of circulator 16 by way of circuit path 15 travels around the circulator to the second antenna element 4 at the rear of the antenna cell 2 where it is radiated through the intervening space 5 to the space feed antenna 6. As is well known, a beam is formed by phased array radar systems by so adjusting the phase control device 12 in each of the antenna cells 2 that the energy emerging from all of the second antenna elements 4 at the rear of the array will arrive coherently at the space feed antenna 6. Thus one beam is formed by adjusting the phase control element in one of the modulator channels in each of the antenna cells 2 and a second beam may be simultaneously formed by similarly adjusting another phase control element in a second modulator channel in each of the antenna cells. Consequently, as many beams may be simultaneously formed as there are modulator channels in each cell.

The microwave energy received by the space feed antenna 6 enters a circulator 22 in radar 7 where it travels around to the port leading to a frequency separation means shown as filter 24 in FIG. 2. Here it emerges from the circulator and enters filter 24 where it is separated according to frequency and applied to the beam receivers 25 of the radar. Filter 24 may be any conventional passive filter network or, alternatively, may comprise conventional tuned radio frequency receivers or other networks of an equivalent nature. The beam receivers 25 are conventional receivers used in phased array radar systems.

In order to successfully effect a separation of the beams to be applied to the beam receivers 25 it is necessary that each of the beams emerging from the frequency separation means 24 be of a different frequency. The frequency existing in any one of the output channels from frequency separation means 24 corresponds to a particular one of the modulator channels 11 in each of the cells 2 of the antenna array. Since the radar energy received from all of the reflecting objects is of the same frequency, the different frequencies to be obtained from each of the channels in each cell is obtained by beating the signal energy with a different frequency obtained from one of the local oscillators 23. There are as many local oscillators as there are beams to be formed and their combined outputs are applied to one of the ports of microwave circulator 22. They emerge from the port leading to the space feed antenna 6 from which they are radiated through the intervening space 5 to all of the second antenna elements 4 at the rear of the antenna array. The energy entering each antenna 4 is applied to one of the ports of circulator 16 and emerges from the next port leading by way of circuit path 17 to a frequency separation filter 18. This filter may be of a character similar to filter 24. There are as many output paths 19 from this filter as there are beams to be formed so that each path leads through an isolating amplifier 20 to one of the modulators 13. Although not essential, it is preferable that each of the modulators 13 also contain a sideband selection means which is usually a conventional part of most modulator structures. This will prevent interaction between the several modulators and will also eliminate from the rest of the circuitry microwave energy which it would not use. In the practice of the present invention, it is preferred that this sideband selection means select the upper sideband although this also is not essential.

From the preceding description it will be evident that the several beams to be formed are obtained by a frequency multiplexing technique involving beating the radar signals received in each channel with a different local oscillator frequency. The upper sidebands are then selected in each channel, transmitted through the intervening space 5 to the frequency separation means 24 where they are again separated according to frequency for application to the conventional beam receivers 25. It will be apparent that this space feed arrangement completely eliminates all of the very bulky and costly corporate feed nework that is customarily used between the phased array antenna and the rest of the radar circuitry.

The radar 7 conventionally contains a data processor 26 which is normally used for processing the received data and for automatically guiding the radar beams. Signals from data processor 26 are transmitted over cable 8 to a plurality of cables 8A, 8B-8N leading the several antenna cells 2 in the array. As shown within the dotted rectangle 2, cable 8B leads to a decoder 21 of conventional design which receives these signals and directs them to appropriate variable phase control means in the several modulator channels 11. The signals from the data processor 26 control the phase adjustment of these variable phase controls 12 so as to focus each beam on the space feed antenna 6 as previously described. In accordance with conventional practice, phase controls 12 are preferably of the digital type. As the data processor decoder and phase control structures are all conventional, further description thereof is unnecessary.

It is to be emphasized that all of the circuitry in each of the blocks shown in FIGS. 2 is of a conventional character, commonly used in present day radar systems. Those skilled in this art are aware of a variety of circuit devices which may be substituted for those specifically suggested in this specification without departing from the scope of this invention. It may also be mentioned that, while applicant has shown the variable phase control means 12 serially connected between the power divider 10 and the modulator 13 as the preferred arrangement, this is not essential and modulator 13 and the phase control means may be interchanged. Also, diplexers may be substituted for the circulators 16 and 22. Again, conventional up-converters may be used in place of the modulators 13, in which case gain is realized as well as frequency conversion. Another obvious variant is to use outputs from the local oscillators to self-tune the filters 24 or the beam receivers 25.

What is claimed is:

1. A multibeam formation means for a phased array radar receiver which radar receiver includes a plurality of beam receivers, a means for generating phase control signals for beam steering and an array of receiver antenna elements each capable of simultaneously receiving reflections from a plurality of targets in space, said multibeam formation means comprising a single space feed antenna with means coupling it to said receiver antenna elements comprising a second antenna element for each of said receiver antenna elements, each of said second antenna elements being coupled through space to said single space feed antenna, a plurality of channels connected in parallel between each of said receiver antenna elements and its second antenna element, each of said channels containing a modulator, a plurality of local beating oscillators coupled to said space feed antenna so that said space feed antenna may feed beating frequencies generated by said oscillators through space to each of said second antenna elements, a frequency separation filter coupled to each of said second antenna elements to separate said beating frequencies into separate output paths from said filter, means connecting each path to one of said modulators to generate modulation products therein for transmission by its second antenna element to said space feed antenna, and a second frequency separation filter coupled to said space feed antenna for selecting desired sidebands from each of said modulators for transmission to the beam receivers of said radar.

2. The combination of claim 1 wherein said beating oscillators are coupled to said space feed antenna through a microwave circulator having three ports, one port being coupled to said beating oscillators, a second port being coupled to said space feed antenna and the third port being coupled to said second frequency separation filter.

3. The combination of claim 1 wherein the connection between each of said second antenna elements and said plurality of parallel connected channels includes a microwave circulator having three ports, one of said ports being coupled to all of said parallel connected channels, a second port being coupled to said second antenna element and the third port being coupled to said first named frequency separation filter.

4. The combination of claim 1 and a variable phase control means included in each of the said plurality of channels connected in parallel between said receiver antenna elements and their second antenna elements and means for coupling said phase control means to a source of phase control signals.

5. The combination of claim 4 wherein each of said phase control means is connected in series between said modulator and its receiver antenna element.

6. The combination of claim 1 wherein each of said modulators includes means for selecting only one sideband from among the modulation products for transmission by its second antenna element to said space feed antenna.

7. A multibeam formation means for a phased array radar receiver which radar receiver includes a plurality of receiver antenna elements arranged in a planar array to simultaneously receive radar signals reflected from a plurality of targets in space, a means for generating phase control signals for beam steering and a plurality of beam receivers, said multibeam formation means comprising a second antenna element for each of said receiver antenna elements, a plurality of parallel connected paths coupling each receiver antenna element to its second antenna element so that each path will receive radar signals from its receiver antenna element, a variable phase control means and a modulator serially connected in each of said parallel connected paths, a single space feed antenna coupled through space to all of said second antenna elements, a plurality of local oscillators having different frequencies, means coupling said oscillators to said space feed antenna to transmit said frequencies to all of said second antenna elements, a first frequency separation means coupled to each of said second antenna elements to receive said oscillator frequencies, said frequency separation means having a different output path for each frequency, means connecting said output paths to said modulators so that each modulator receives a different frequency to develop sidebands by beating with the radar signals received by its receiver antenna element, means in each modulator for selecting one of the sidebands for transmission to said space feed antenna through its second antenna element, a second frequency separation means coupled to said space feed antenna to receive said sidebands, said second frequency separation means having a different output path for each sideband, and means coupling said last named output paths to said beam receivers.

8. The combination of claim 7 wherein said means coupling said oscillators to said space feed antenna comprises a microwave circulator having three ports, one port being coupled to said oscillators, a second port being coupled to said space feed antenna and the third port being coupled to said second frequency separation means.

9. The combination of claim 7 wherein each of said second antenna elements is coupled to its plurality of parallel connected paths by a microwave circulator having three ports, one of said ports being coupled to all of said parallel connected paths, a second port being coupled to said second antenna element and the third port being coupled to said first frequency separation means.

10. The combination of claim 7 wherein said variable phase control means is connected between its serially connected modulator and said receiver antenna element, said phase control means being coupled to receive control signals from said means for generating phase control signals.

11. A multibeam formation means for a phase array radar receiver which radar receiver includes a plurality of receiver antenna elements arranged in a planar array to simultaneously receive radar signals reflected from a plurality of targets in space, a means for generating phase control signals for beam steering and a plurality of beam receivers, said multibeam formation means comprising a plurality of parallel-position tubular antenna cells each having one of said receiver antenna elements mounted at one of its ends, a second antenna element mounted at the opposite end of each cell, a plurality of modulator channels connected in parallel between said two antenna elements in each of said cells, each channel including a variable phase control means and a modulator, a single space feed antenna positioned opposite to and electrically coupled with all of said second antenna elements, a plurality of local beating oscillators coupled to said space feed antenna so that said space feed antenna may transmit beating frequencies from said oscillators to all of said second antenna elements, a first frequency separation means in each cell coupled to its second antenna element to receive and separate said beating frequencies into separate bands, a plurality of output paths connecting each of said frequency separation means to the modulators in its cell so that each modulator may receive only one of said bands to develop modulation products therein with the radar signals received by its receiver antenna element, a sideband selection means in each modulator to permit transmission of only one of the sidebands through its second antenna element to said space feed antenna, a second frequency separation means coupled to said space feed antenna to receive said sidebands and separate them into discrete frequency bands, and means coupling said second frequency separation means to said beam receivers to transmit said frequency bands from said second frequency separation means to said beam receivers.

12. The combination of claim 11 wherein said local beating oscillators are coupled to said space feed antenna through a microwave circulator having three ports, one port being coupled to said oscillators, a second port being coupled to said space feed antenna and the third port being coupled to said second frequency separation means.

13. The combination of claim 11 wherein said second antenna element is coupled to said parallel connected modulator channels and said first frequency separation means through a microwave circulator having three ports, one of said ports being coupled to all of said parallel connected modulator channels, a second port being coupled to said second antenna element and the third port beig coupled to said first frequency separation means.

14. The combination of claim 11 wherein the variable phase control means in each channel is connected between its modulator and its receiver antenna element, said phase control means being coupled to receive control signals from said means for generating phase control signals.

References Cited

UNITED STATES PATENTS

| | | | |
|---|---|---|---|
| 3,259,902 | 7/1966 | Malech | 343—854 X |
| 3,309,700 | 3/1967 | Garrison. | |
| 3,305,867 | 2/1967 | Miccioli et al. | |

RODNEY D. BENNETT, *Primary Examiner.*

C. L. WHITHAM, *Assistant Examiner.*